United States Patent Office 3,083,060
Patented Mar. 26, 1963

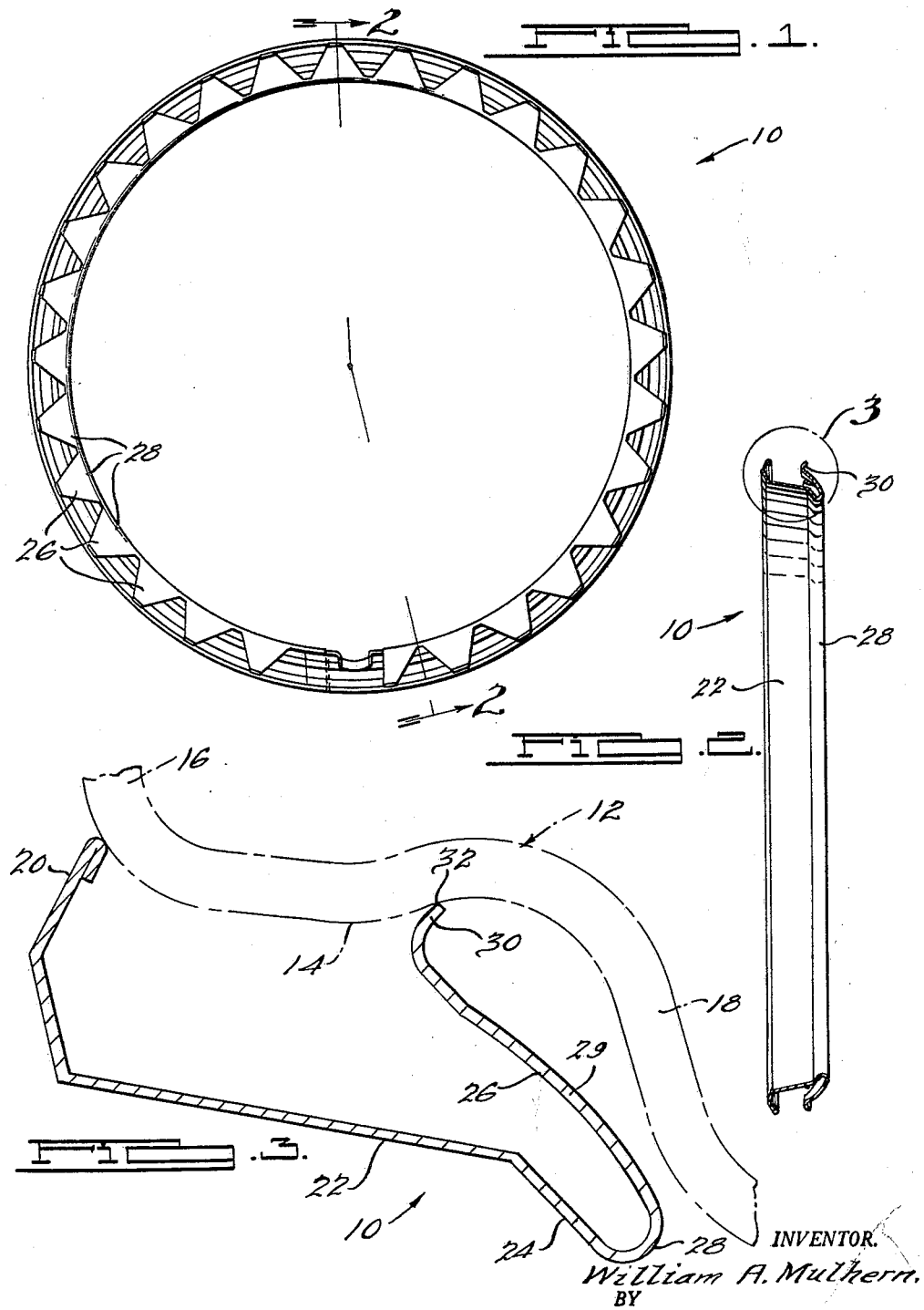

3,083,060
DECORATIVE WHEEL TRIM
William A. Mulhern, Detroit, Mich., assignor to Gar Wood Industries, Inc., Wayne, Mich., a corporation of Michigan
Filed Sept. 7, 1960, Ser. No. 54,409
1 Claim. (Cl. 301—37)

This invention relates generally to decorative trim members for the wheels of a motor vehicle and more particularly to an improved means for retaining a decorative trim member on a vehicle wheel.

An ornamental or decorative trim member for a wheel of a motor vehicle is required to be positively engageable with the wheel yet be readily removable therefrom without deleteriously affecting the wheel trim retaining means. Such a trim member is required to be usable on wheels having safety rims, cover retaining embossments or other particular structural characteristics without necessitating modification of either the trim member or the vehicle wheel to effect proper engagement therebetween. Further, the trim member should be relatively inexpensive and easy to manufacture.

The present invention is directed to an improved means for retaining a trim member on a vehicle wheel. Trim members provided with the retaining means of the present invention exhibit unexpectedly improved holding power as compared to wheel trims heretofore known and used. Further, a trim member provided with the retaining means of the present invention is relatively easily applied to and removed from the face of a vehicle wheel without impairing the improved holding power thereof.

In accordance with the present invention, a retaining means for a wheel trim comprises an axially inwardly extending retaining flange having a plurality of reentrantly folded radially and axially outwardly extending retaining fingers. A terminal end portion of each finger is folded substantially normally to the body portion of the finger so as to engage an axially extending flange on the vehicle wheel in a radially outwardly and axially inwardly direction thereby maximizing the holding power of the fingers and precluding distortion thereof upon installation and removal of the wheel trim from the vehicle wheel.

Accordingly, one object of the present invention is to provide an improved retaining means for an ornamental wheel trim.

Another object of the present invention is a retaining means for a wheel trim that is relatively easily applied and removed from the face of a vehicle wheel.

Another object of the invention is an improved form of retaining tooth for a wheel trim retaining means.

Other objects and advantages of the present invention will become apparent from the following detailed description, claim and drawings wherein:

FIGURE 1 is a rear view of a wheel trim having an improved retaining means in accordance with an exemplary embodiment of the present invention;

FIG. 2 is a cross sectional view taken from substantially along the line 2—2 of FIGURE 1; and FIG. 3 is an enlarged cross sectional view of the area within the circle 3 of FIG. 2.

More particularly, a wheel trim 10, in accordance with an exemplary embodiment of the present invention is shown in association with a vehicle wheel 12 (FIG. 3). The wheel 12 has an axially extending intermediate flange 14, a radially outwardly extending terminal flange 16 and a radially inwardly directed wheel flange 18. The wheel trim 10 is retained on the vehicle wheel 12 by engagement of the axially extending flange 14, in a manner to be described.

The wheel trim 10 comprises an annular outer face 20, an axially inwardly extending retainer flange 22 having a radially inwardly directed inner end portion 24 and a plurality of radially and axially outwardly directed retaining fingers 26. It is to be noted that the particular configuration of the outer face 20 forms no part of the present invention, it being understood that the face 20 can extend radially inwardly to form a full cover for the wheel 12 if desired.

The axially inner end portion 24 of the retainer flange 22 is reentrantly folded radially and axially outwardly to form the base portion 28 of the radially outwardly extending fingers 26. Each of the fingers 26 is of generally triangular configuration and has a body portion 29 and a terminal end portion or tooth 30 with a terminal edge 32 that is engageable with the flange 14 of the vehicle wheel 12.

In accordance with the present invention, the terminal end portion 30 of each finger 26 is folded generally normally to the body portion 29 thereof so as to extend radially outwardly and axially inwardly of the retaining flange 22 whereby the edge portion 32 thereof bitingly engages the flange 14 of the vehicle wheel 12. In an exemplary constructed embodiment, the terminal end portion 30 of the finger 26 is folded at a 90 degree angle to the body portion 29 of the finger 26 at a radius of .06 inch. The terminal end portion 30 is .04 inch long and .18 inch wide at the edge portion 32 thereof.

This orientation of the terminal end portion 30 of the fingers 26 materially increases the holding power of the wheel trim 10, on the vehicle wheel 12. The terminal end portion 30 of the finger 26 is stiffened by the circumferential fold therein so that flexure of the fingers 26 upon installation of the wheel trim 10 on the wheel 12 takes place primarily at the reentrantly folded portion 28 thereof where it is relatively strong and of maximum circumferential dimension. After installation, the reaction force engendered by the inherent bias of the tooth or terminal end portion 30 of the finger 26 against the wheel flange 14 tends to bias the trim 10 axially inwardly of the wheel 12. Upon removal of the wheel trim 10, the end portion 30 functions as a cam to bias the finger 26 radially inwardly, flexure taking place primarily at the folded portion 28 thereof where the tooth 26 is of maximum circumferential dimension.

Thus, the folded end portion 30 of the finger 26 serves three distinct but mutually complementary functions, namely, to reinforce the radially outer end of the finger 26 upon installation and removal of the wheel trim 10 so that flexure of the finger 26 is about the folded portion 28 thereof, to direct the reaction force due to the inherent bias or resilience of the fingers 26 axially inwardly of the wheel 12 to normally bias the wheel trim 10 towards the wheel 12, and to function as a cam to initiate radially inward flexure of the finger 26 upon removal of the wheel trim 10 from the wheel 12.

It is to be understood that the specific construction of the improved decorative wheel trim herein disclosed and described is presented for the purpose of explanation and illustration and is not intended to indicate limits of the invention, the scope of which is defined by the following claim.

What is claimed is:

In a vehicle wheel structure including a tire rim having a radially extending wheel flange, a radially extending terminal flange, and an axially extending intermediate flange therebetween, a wheel trim for disposition on the outer face of the vehicle wheel comprising a trim member having an axially inwardly extending retaining flange with a plurality of integral radially and axially outwardly extending retaining fingers, said retaining fingers having a body portion extending generally parallel to the intermediate flange of said wheel, said retaining fingers having radially outwardly and axially inwardly extending terminal end portions, respectively, the terminal end portions of said fingers extending generally normally to the body portion thereof and having radially outwardly facing circumferentially extending biting edges for engagement with the axially extending intermediate flange on the vehicle wheel.

References Cited in the file of this patent

UNITED STATES PATENTS

| | | |
|---|---|---|
| 2,394,958 | Wood | Feb. 12, 1946 |
| 2,683,632 | Lyon | July 13, 1954 |
| 2,732,260 | Lyon | Jan. 24, 1956 |
| 2,757,981 | Lyon | Aug. 7, 1956 |
| 2,757,985 | Lyon | Aug. 7, 1956 |
| 2,857,210 | Lyon | Oct. 21, 1958 |
| 2,926,960 | Lyon | Mar. 1, 1960 |

FOREIGN PATENTS

| | | |
|---|---|---|
| 1,015,295 | France | July 2, 1952 |